United States Patent [19]

Zhang et al.

[11] Patent Number: 5,484,351
[45] Date of Patent: Jan. 16, 1996

[54] ARRANGEMENT FOR CONTROLLING THE TORQUE TO BE SUPPLIED BY A DRIVE UNIT OF A MOTOR VEHICLE

[75] Inventors: Hong Zhang, Bietigheim-Bissingen; Martin Streib, Vaihingen/Enz, both of Germany

[73] Assignee: Robert Bosch GmbH, Stuttgart, Germany

[21] Appl. No.: 69,606

[22] Filed: Jun. 1, 1993

[30] Foreign Application Priority Data

Jun. 20, 1992 [DE] Germany ........................... 42 20 243.4
Feb. 17, 1993 [DE] Germany ........................... 43 04 779.3

[51] Int. Cl.$^6$ .................................................. B60K 41/04
[52] U.S. Cl. ................................. 477/113; 477/110
[58] Field of Search ........................... 477/110, 111, 477/112, 113; 123/339

[56] References Cited

U.S. PATENT DOCUMENTS

| | | | |
|---|---|---|---|
| 4,721,083 | 1/1988 | Hosaka | 123/339 |
| 4,732,125 | 3/1988 | Takizawa | 123/339 |
| 4,815,433 | 3/1989 | Wild | 123/339 |
| 5,069,181 | 12/1991 | Togai et al. | 123/339 |

*Primary Examiner*—Charles A. Marmor
*Assistant Examiner*—Sherry Estremsky
*Attorney, Agent, or Firm*—Walter Ottesen

[57] ABSTRACT

An arrangement controls the torque to be supplied by a drive unit of a motor vehicle especially a motor vehicle at standstill or a rolling motor vehicle. Apparatus are provided which compute the adjustment of the power parameters of the drive unit which is necessary for making this torque available. A correction is provided at least in dependence upon the torque requirement of a transmission unit of the motor vehicle in idle or near-idle range outside of driving operation. In addition, corrective devices with respect to engine torque loss as well as torque requirements of ancillary equipment of the motor vehicle are provided. These characteristic fields are adaptatively determined in a further embodiment and can be adapted to deterioration.

14 Claims, 3 Drawing Sheets

ARRANGEMENT FOR CONTROLLING THE TORQUE TO BE SUPPLIED BY A DRIVE UNIT OF A MOTOR VEHICLE

BACKGROUND OF THE INVENTION

United States patent application Ser. No. 07/993,060, filed Dec. 18, 1992, discloses an arrangement for controlling the torque supplied by a drive unit of a motor vehicle. In this arrangement, a desired value for the output torque of the drive chain of a motor vehicle is formed at least in dependence upon a request of the operator of the vehicle. This desired value is converted into a transmission ratio of a transmission unit and into a desired value for the torque to be supplied by the drive unit of the motor vehicle. This desired value is supplied to a further arrangement which provides a torque corresponding to the pregiven desired value while considering variables influencing the torque by adjusting the power parameters of the drive unit. In addition, the torque requirement of additional consumers must be considered for which the drive unit must develop a certain torque for their operation. These consumers include, for example, air conditioners, power steering and the like. The torque loss of the drive unit in each case is also considered by means of characteristic fields as well as the torque correction of an idle controller.

Additional data with respect to the control of the torque to be supplied by the drive unit at standstill or when the motor vehicle is rolling are not provided in the state of the art and especially for the situation where a force connection between the drive unit and the wheels exists.

SUMMARY OF THE INVENTION is an object of the invention to provide measures which permit the control of a torque supplied by the drive unit when the vehicle is at standstill and when the vehicle is rolling, with this control being as precise as possible while considering the occurring losses and especially independent of long-term changes or changes in the area of the drive unit which take place slowly, as well as changes of the motor vehicle or the control arrangement.

This is achieved in that at least the torque requirement of a transmission unit of the motor vehicle is determined and is considered at least then when no request from the operator is present (stationary or rolling motor vehicle) for determining the set value of the torque to be supplied. In addition, at least the determination and consideration of lost torque of the drive unit and/or of at least one consumer, which loads the drive unit, is provided. An independence with respect to changes is obtained by adaptation of the characteristic fields or characteristic lines used to make the determinations.

U.S. Pat. No. 4,815,433 discloses a method for adapting characteristic fields in connection with an idle engine speed control for controlling the air supplied to an internal combustion engine. In this method, so-called characteristic fields are provided which form a control signal in dependence upon operating variables. The control signal acts after the controller and forward of the control path when viewed in the working direction of the control loop and takes load away from the controller during rapid load changes. For adapting these control fields, the output signal of the controller is detected and the characteristic field signal is changed in the context of a further control loop until the controller output signal has reached its mean value, especially 0. The characteristic field is thereby adapted at least at one operating point to the changes present. With reference to the adaptation of characteristic fields described below in combination with the described arrangement for the control of the torque supplied by a drive unit, the methods described in U.S. Pat. No. 4,815,433 can be helpful so that this patent, which discusses the basics of the adaptation method, is incorporated herein by reference.

By considering the torque requirement of a transmission unit of a motor vehicle, an adaptation of the engine speed is obtained, not only for standstill, but also for torque requirements of the transmission unit (especially the converter of the transmission unit), which change in accordance with road speed. This adaptation of engine speed is achieved for slowly rolling motor vehicles in idle and/or for near-idle operation of the drive unit with the adaptation being to the value of the stationary motor vehicle. This measure leads directly to the reduction of the fuel consumption.

For a slowly rolling motor vehicle, the idle engine speed controller is held in the optimal control range by considering the torque requirement of the drive unit of the motor vehicle while avoiding the idle engine speed controller. Accordingly, no jump in engine speed need be feared during a transition into the actual idle range and the stabilization of the idle engine speed is improved.

With respect to the above, the further advantage is provided that, for slowly rolling motor vehicles, the rpm of the drive unit remains constant independently of the torque requirement of the transmission unit without it being necessary for the idle engine speed controller to intervene to provide compensation.

It is especially advantageous that a threshold for the fuel cutoff can be determined, which leads to a cutoff of the fuel metering while the motor vehicle rolls, when torque requirement of the transmission unit drops below this value.

The quality of the torque control for stationary and for rolling motor vehicles is again significantly improved by means of the adaptation of the characteristic fields or characteristic lines while considering the particular disturbance variables.

It is especially advantageous that the dependence of the torque contribution upon the disturbance variable can be individually adapted for each disturbance variable by means of the adaptation. The adapted characteristic fields or characteristic line values can be used not only for controlling the engine torque for a stationary or rolling motor vehicle but also in normal driving operation.

The procedure provided by the invention is independent of the special engine type (Otto engine, diesel engine, et cetera) because the above measures only change and influence the torque to be supplied and there is no direct intervention as to the air supply or fuel metering.

The application of the procedure provided by the invention is advantageous with respect to the subject matter of the above-identified patent application Ser. No. 07/993,060 as well as in connection with an idle control without determining the driver's request.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
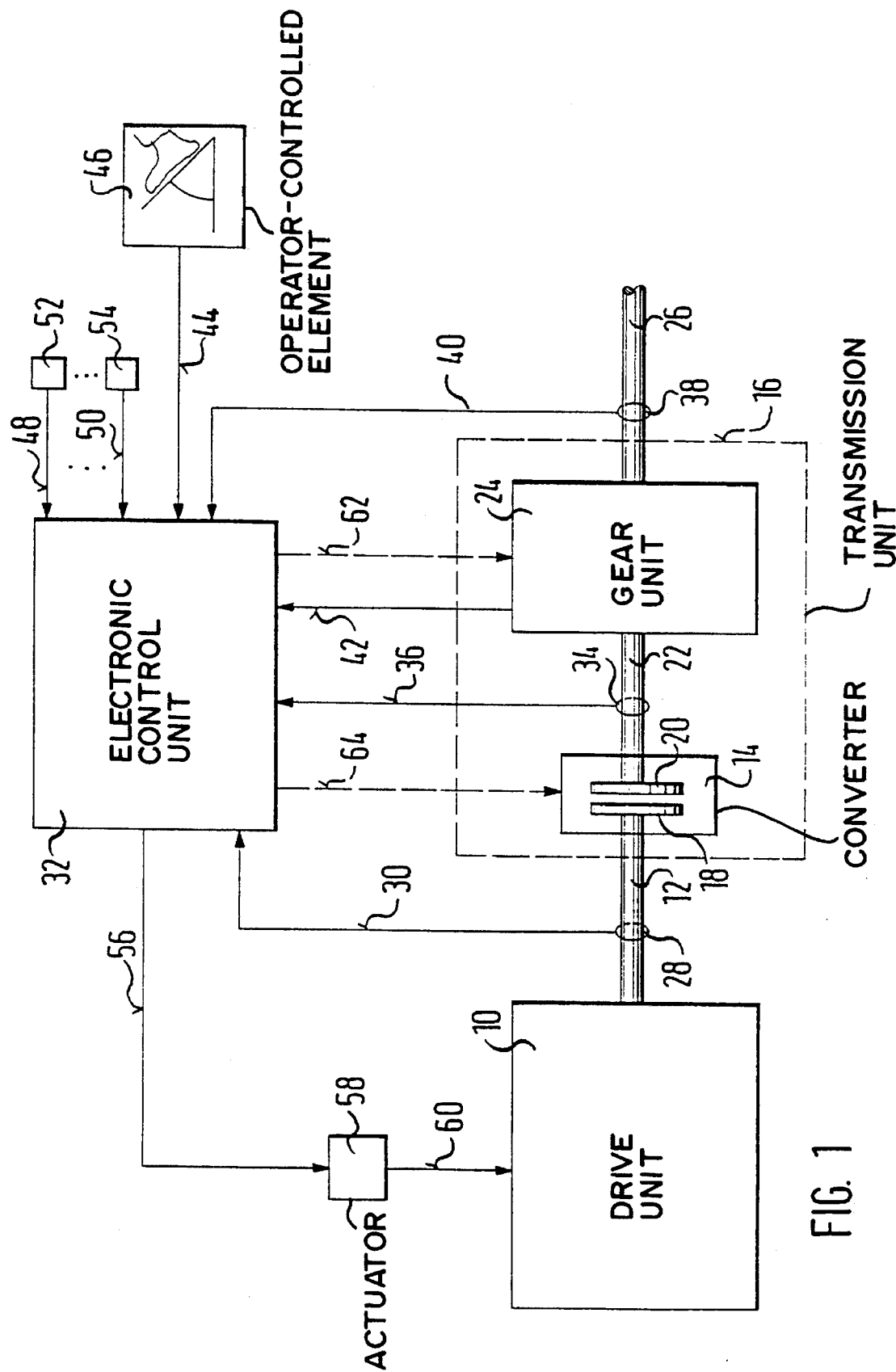
FIG. 1 is a schematic diagram of an arrangement for controlling the output torque supplied by the drive chain.

In FIG. 1, reference numeral 10 identifies a drive unit of a motor vehicle and is especially a motor. The motor is preferably an internal combustion engine. However, in other advantageous embodiments, this drive unit can also operate on the basis of alternative drive concepts and can, for example, be an electric motor.

The drive unit 10 is connected via a first shaft 12 to a converter 14 of a transmission unit 16. The shaft 12 is connected to a first turbine wheel 18, whereas a second turbine wheel 20 of the converter 14 is connected to a further shaft 22. The shaft 22 leads to the gear unit 24 having an output shaft 26 which defines the output shaft of the drive chain of the motor vehicle. Drive unit 10, transmission unit 16 as well as the shafts 12, 22, 26 essentially conjointly define the drive chain of the motor vehicle.

The following measuring devices are provided for measuring rpm. A measuring device 28 detects the rpm of the shaft 12 and therefore the rpm n_mot of the drive unit 10. A connecting line 30 extends from the measuring device 28 to the electronic control unit 32. A measuring device 34 detects the rpm of the shaft 22 and therefore the so-called turbine rpm n_turb of the converter. A connecting line 36 connects the measuring device 34 to the electronic control unit 32. A third measuring device 38 detects the rpm of the shaft 26, that is, the output rpm n_ab of the drive chain. A connecting line 40 connects the measuring device 38 to the electronic control unit 32. In addition, a connecting line 42 leads from the transmission 34 to the control unit 32. A signal representing the transmission position is transmitted via this connecting line 42 as required.

The line 44 defines a further input line of the control unit 32 and connects the control unit 32 to an operator-controlled element 46. In addition, input lines 48 to 50 are provided which connect the control unit 32 to the measuring devices 52 to 54 for operating variables of the drive unit, the drive chain and/or the motor vehicle. A line 56 represents the output lines of the control unit 32 which are connected to one or more actuators 58. The actuators adjust the power parameters of the drive unit 10 which is symbolized by the connecting line 60.

If the transmission unit 16 is an electronically-controlled transmission having an electronically-controlled converter, then the output lines 62 and 64 can be provided for the control unit 32 which connect the control unit 32 to the transmission 34 or converter 14 for control purposes.

In another advantageous embodiment, the control unit 32 includes an idle control in the context of which the procedure according to the invention takes place without the means 44 and 46 for electrically detecting the request of the driver being present.

The operation of this arrangement is disclosed in the above-identified United States patent application Ser. No. 07/993,060, which is incorporated herein by reference. From the driver request transmitted via the input line 44, the control unit 32 forms a desired value for the output torque to be supplied by the drive chain for fulfilling the driver's request. This desired value of the output torque is converted by a combination of an adjustment of a drive unit 10 as well as a torque which is required by this adjustment of the drive unit 10 for making available the output desired torque value and which torque is to be supplied by the drive unit 10 to the shaft 12. The above combination is selected with respect to a minimum fuel consumption or maximum acceleration.

Depending upon the configuration of the transmission unit 16, the desired adjustment is made by setting a predetermined transmission ratio of the transmission 24 via the line 62 and, if required, a control of the converter 14 via the line 64. The control unit 32 computes a value for setting the power parameters of the drive unit 10 while considering the detected rpm values as well as further operating variables of the drive unit 10 or of the drive chain and/or of the motor vehicle which are detected by the measuring devices 52 to 54. This value or these values are transmitted via the line 56 to the actuator 58, which adjusts the pregiven power parameter values via the line 60.

For internal combustion engines, the position of a throttle flap controlling the air input to the engine, as well as the fuel quantity to be injected or the ignition angle to be adjusted, are determined.

In other embodiments, for example in the case of an electric drive, the current flowing through the winding of the motor constitutes the power parameter with the actuator 58 in this case representing the corresponding switching elements for adjusting the current flowing through the motor winding.

In the case of manual transmissions, the control unit 32 determines the torque to be supplied by the motor for adjusting the output torque desired value by means of a characteristic field in dependence upon the driver request.

If the procedure provided by the invention is applied in the context of an idle control without the driver request being determined and being processed in the manner described above, then the control of the transmission unit takes place in dependence upon factors such as rpm and load; whereas, in idle and near-idle operation (accelerator pedal released, no overrun cutoff), an idle control is active wherein the power parameters of the engine are controlled to cause the actual rpm to approach the desired rpm.

Figure 2:
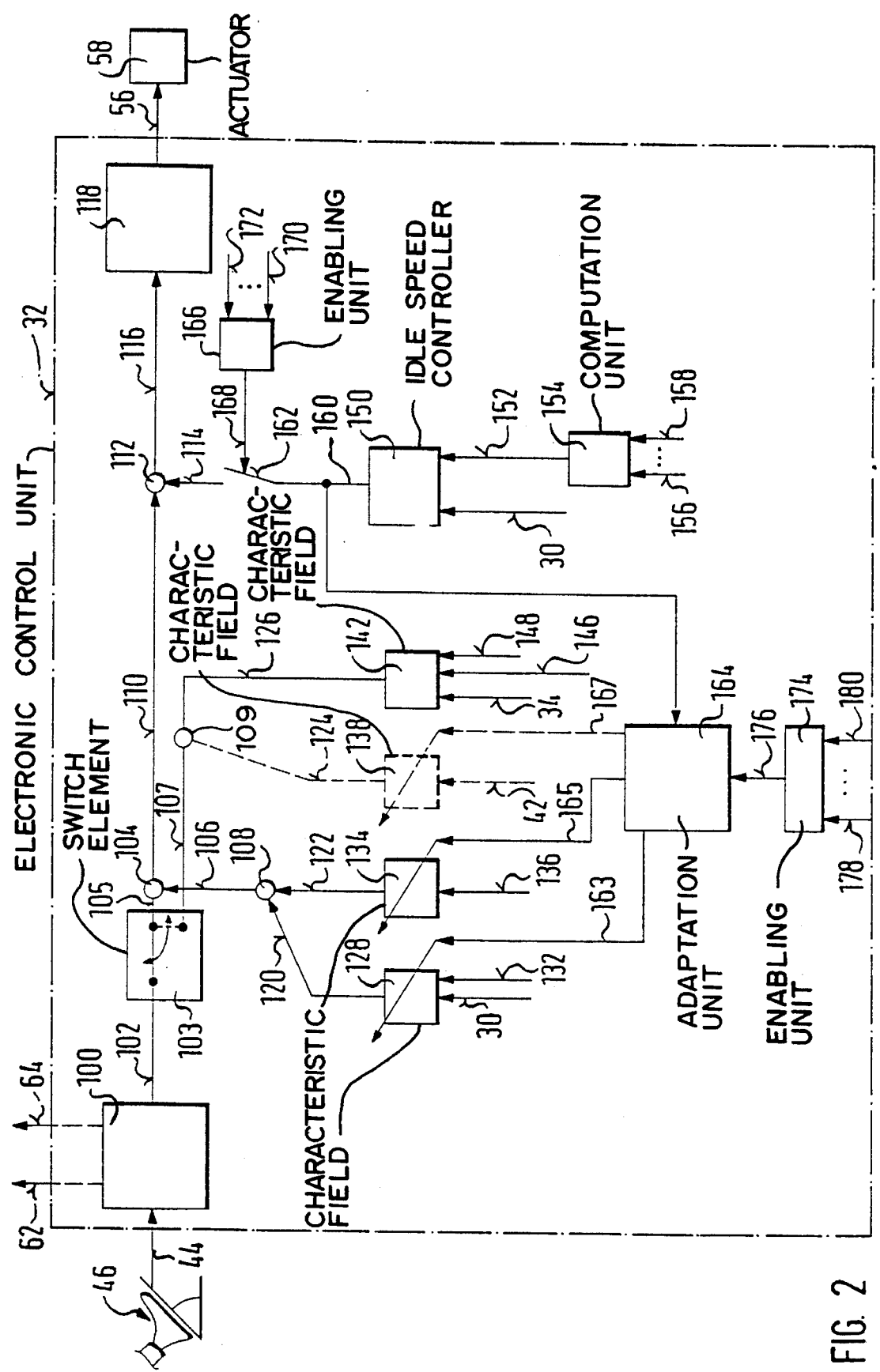
FIG. 2 is a block diagram of an arrangement for controlling the torque supplied by the drive unit; and, FIG. 3 is a flowchart for explaining the procedure of the invention in the case of a motor vehicle which is at standstill or is rolling.

FIG. 2 is a block circuit diagram of the control unit 32 for the description of the procedure provided by the invention which follows. In this embodiment, the description is provided for an internal combustion engine without eliminating other possible applications. The elements of FIG. 2, which were described above with respect to FIG. 1, are identified by the same reference numerals.

The control unit 32 comprises a first element 100 to which the line 44 leads from the operator-controlled element 46, which can be actuated by the driver of the vehicle. Output lines of element 100 are the lines 62 and 64 for controlling the transmission unit 16 as well as a line 102 which leads to a switch element 103 having an output line 105 which, in turn, leads to a circuit node 104. A further line 106 from a second circuit node 108 is connected to this circuit node 104. The output line 110 of the circuit node 104 leads to a third circuit node 112 and a line 114 is connected to this circuit node 112. A line 116 leads from the third circuit node 112 to the element 118 having an output line represented by the line 56.

A second input line 107 of the switch element 103 connects this element to a circuit node 109. Lines 126 and/or 124 are connected to circuit node 109. The lines 126 and/or 124 connect the circuit node 109 to the characteristic fields or characteristic lines 142 and/or 138.

The lines 120 and 122 are connected to the second circuit node 108 in a preferred embodiment. These lines 120 and 122 connect the circuit node 108 to the characteristic fields or characteristic lines 128 and 134. The line 120 connects the characteristic field 128 for the torque loss of the drive unit to the circuit node 108. Measured values for the rpm n_mot of the drive unit (detected by the measuring device 28) as well as the engine temperature T_mot (detected by one of the measuring devices 52 to 54) are transmitted via lines 30 and 32 to the characteristic field 128. A further characteristic field defines the characteristic field 134 for additional consumers of the motor vehicle. This characteristic field is connected via the line 122 to the circuit node 108. The lines 136 are connected to the characteristic field 134. Status data of additional consumers (switched on or switched off in the case of climate controls, et cetera) or a measure for the load of the drive unit by the consumer (for example, generator current, current through heatable front and rear windshields, et cetera) are conducted to the characteristic field 134 via the lines 136. In another embodiment, the characteristic field can be separated into characteristic lines or characteristic fields for each individual consumer or groups of consumers can be assembled to one characteristic field.

In addition, the computation element or the characteristic field 142 is connected via the line 126 to the circuit node 109. The turbine rpm, the idle desired rpm n__LL__des and the oil temperature T__oil of the converter 14 are transmitted via lines 34, 146 and 148, respectively, to the circuit node 109. From this data, the computation element 142 computes the torque requirement of the transmission unit or of the converter with respect to the particular operating condition in accordance with the equation shown below.

As an alternate to the computation element 142, a characteristic field 138 can be provided in another embodiment for detecting the torque requirement of the transmission. This characteristic field 138 is connected via the line 124 to the circuit node 109. Data as to the gear position is provided via the line 42.

In addition, an idle speed controller 150 is provided and the rpm of the drive unit 10 is supplied to the controller 150 via line 30 and the idle rpm desired value is supplied to controller 150 via line 152. The idle rpm desired value is formed in the computation unit 154 from operating variables of the drive unit and/or of the motor vehicle. These operating variables are detected by measuring devices 52 to 54 and are supplied to the computation unit 154 via lines 156 to 158, respectively. The output line 160 of the idle speed controller 150 is conducted, on the one hand, to a switch element 162 and, on the other hand, to an adaptation unit 164. An actuating signal is emitted to switch element 162 from a first enabling unit 166 via the line 168 in dependence upon operating variables which detect a stationary or rolling motor vehicle. The operating variables are detected by the corresponding measuring devices shown in FIG. 1 and are supplied via respective lines 170 to 172.

A second enabling unit 174 activates the adaptation unit 164 via line 176. Operating variables of the drive unit or motor vehicle are detected by the measuring devices shown in FIG. 1 and are supplied to the second enabling unit 174 via the respective lines 178 to 180. The conditions present for activation of the adaptation are recognized from these operating variables. The adaptation unit 164 is connected to the characteristic fields 128, 134 and/or 138 via respective lines 163, 165 and 167 for adaptation to the operating conditions present.

In FIG. 2, the measuring devices detecting the respective operating variables have been omitted for clarity.

In the embodiment, where there is no detection of the driver request, the elements 62, 64, 44, 46, 100, 102 and 103 are omitted. In lieu of switch element 103, a connection is inserted as shown in phantom outline.

The operation of the elements 100 and 118 is described in the above-identified United States patent application Ser. No. 07/993,060 which is incorporated herein by reference.

The procedure provided by the invention is based on the general physical considerations presented below. The desired value transmitted on the line 102 for the torque to be supplied by the drive unit 10 defines a desired value for the indicated engine torque in the case of an internal combustion engine, that is, the engine torque generated on the basis of the combustion operation of the internal combustion engine. The engine torque required for making the desired output torque available increases in that a portion of this engine torque is not available for driving the motor vehicle; instead, this part is to be used for driving ancillary equipment as well as to compensate for losses. For this reason, there is an addition at circuit node 104 of the desired value for the engine torque and the actual components of the torque loss determined on the basis of the characteristic fields and of the torque requirement of the ancillary equipment.

A torque component of the transmission unit and especially of the converter and of the idle speed controller must be considered when forming the indicated engine torque for a stationary or rolling motor vehicle. For this reason, the line 102 is connected to a switch element 103 having an output line 105 connected to the circuit node 104. In addition, the switch element 103 has an input line 107. In the idle range or in the near-idle range, the switch element 103 connects the lines 107 and 105 (broken line); outside of this range, the lines 102 and 105 are connected (solid line). The torque component of the transmission unit is added to the indicated engine torque computed in the connecting node 104 with this addition being positive or negative in dependence upon control deviation.

The torque component of the idle speed controller 150 as well as of the converter is considered only for stationary or rolling motor vehicles in idle operation or near-idle operation of the drive unit. This is shown for the idle controller in FIG. 2 with respect to the switch element 162, which is only then closed when a corresponding actuating signal is applied via the line 168. This actuating signal is generated in the unit 166, for example, for a released accelerator pedal and for a road speed lower than a threshold value. In addition to the described detection of the work range of the idle speed controller used in a preferred embodiment, other procedures familiar to those skilled in the art can be applied in other embodiments, for example, based on the throttle flap angle, the engine speed, et cetera.

The torque requirement of the transmission unit is computed in block 142 and forms a desired value by appropriate switch position of the switch element 103 in the idle range and near-idle range with this desired value being for the torque to be developed in lieu of the coupling torque desired value which is zero in this state (accelerator pedal at rest position). In driving operation, the torque requirement of the transmission unit is considered automatically by control of the output torque.

The torque requirement of the transmission unit or of the converter mo__conv at idle is determined in the computation unit 142 and is dependent essentially upon its oil temperature and the output rpm. The torque requirement can be described as follows:

mo__conv=KT(T-oil)*KMU(n__turb/n__LL__des)*n__LL__des*n__LL__des

In the above, KT defines a factor dependent upon the oil temperature while KMU defines a factor dependent upon the quotient of the turbine rpm (measuring device 34) and the idle desired rpm (block 154). The turbine rpm can either be measured by a measuring device 34 or can be computed by the product of the output rpm (measuring device 38) and the transmission ratio, which is transmitted via the line 42 of the control unit 32.

As a first approximation, the dependence upon the oil temperature can be neglected so that the factor KT can be viewed as being constant in a first approximation.

The dependence of the factor KMU on the rpm ratio turbine rpm to idle desired rpm is known for each transmission type and can be determined from the converter characteristic of the transmission type in the form of a characteristic. In this case, it is to be noted that the torque requirement of the converter takes on positive values for turbine rpms, which are less than the desired idle rpm, and takes on negative values for turbine rpms which are greater than the desired rpm. This means that the torque requirement becomes less with increasing turbine rpm.

With respect to the above, it is advantageous that a criterion for the utilization of fuel cutoff in overrun operation can be obtained from a comparison of the torque requirement of the converter to a pregiven threshold. The engine rpm can in no event be maintained at the idle desired rpm value when the torque requirement of the converter is less than the difference between the sum of the torque components of the torque loss as well as of the additional consumers and the smallest realizable indicated engine torque at which the mixture still remains ignitable. The fuel metering is switched off when the torque requirement of the converter drops below this threshold value.

By means of the measures described above, the torque requirement of a transmission unit is so computed that independently of the turbine rpm, the idle rpm remains constant without it being necessary for the idle controller to intervene. This torque requirement of the transmission unit is for a slowly rolling vehicle (with power transmission) in dependence upon the actual output rpm and the transmission ratio, that is, the actual turbine rpm.

In another embodiment, the torque requirement of the transmission unit can be determined by means of a characteristic or a characteristic field in dependence upon the gear which is engaged.

The effects of such measures are improved in that additional characteristic fields are provided for the indicated engine torque which consider the torque losses of the drive unit and/or the torque requirement of additional consumers.

In FIG. 2, the torque requirement values of the engine loss are determined by means of a characteristic field from engine rpm and engine temperature, the torque requirement values of ancillary equipment such as climate control, the generator, power steering, et cetera from the supplied status data (for example, climate control switched on or switched off) or the load values of the ancillary consumers, for example, in the case of generators of the excitation current.

In a preferred embodiment, the coaction of all these measures leads to a precise adjustment of the idle rpm for stationary and rolling motor vehicle even when there is a force connection, so that the idle speed controller, which, for example, undertakes the fine adjustment of the idle speed via a PID-control strategy, hardly has to act. This leads, in combination, to an essentially constant adjustment of the rpm in idle or near-idle operation of the drive unit.

In the characteristic fields described, the problem of the determination occurs on the one hand, while the problem of deterioration occurs on the other hand. One possibility for determining the characteristic fields would be a determination of these variables for the motor vehicle application and the storage in the form of fixed values. However, this is very complex and furthermore does not consider the effects of deterioration. Accordingly, in a preferred embodiment, the characteristic fields for the engine torque loss, the torque requirement of the ancillary equipment and, if required, the torque requirement of the driving stage are determined with the aid of the idle speed controller, which is available, and are adapted to the changes.

As explained above, the indicated engine torque (mo_ind) is computed from the addition of engine torque loss (mo_oss), consumed torque of ancillary equipment (mo_cons) as well as either coupling desired torque (mo_coup) (in normal operation/driving operation) or the torque requirement of the transmission unit or of the converter mo_conv (in idle or near-idle range outside of the driving operation). The coupling torque is determined from the driver request during normal driving operation.

If no driver request is present, then the coupling torque is 0 (in actual idle state for the condition where there is no power connection, that is, no driving gear is engaged). This means that the indicated engine torque must only provide for the losses internal to the engine as well as, if required, for the consumption by ancillary equipment. For a rolling motor vehicle with force connection (gear engaged) or when the driver request represents a value lying below the output torque which is present, then the coupling torque corresponds to the torque requirement of the converter of the transmission unit.

In addition to the sum described above, a corrective torque of the idle speed controller (d_mo_LLr) is included for an active idle speed controller. This corrective torque is dependent upon the desired and actual values of the engine speed and is determined in the idle speed controller on the basis of a PID-control strategy.

The value of the corrective torque of the idle speed controller cannot deviate in mean time from 0 for an optimal adjustment of the speed. However, if this value deviates in the mean time from 0, then this is an indication that deviations have occurred during the formation of the torque components for a stationary or rolling vehicle. A steady-state deviation of the corrective torque contribution of the idle speed controller is thereby a criterion for undertaking an adaptation of the characteristic field values for determining the torque components. In this way, the quality of the precontrol is considerably improved, whereby the idle speed controller itself must only intervene in exceptional cases.

The conditions for undertaking the adaptation of the individual characteristic fields can be summarized as follows. The adaptation of the characteristic field for the engine torque loss is then undertaken when the engine rotates steady state in idle at the desired rotational speed, no ancillary equipment is connected and no force connection between engine and drive chain exists (transmission in neutral position). The adaptation for the characteristic field of the torque requirement of ancillary equipment is undertaken when the engine rotates at desired rotational speed in idle, the particular consumer is connected and the force connection between engine and drive chain is interrupted (transmission in neutral position or, in the case of a manual transmission, in idle). The adaptation of the torque requirement of the transmission unit to be possibly undertaken in the case of a characteristic field or characteristic line takes place when the engine rotates during idle at the desired rotational speed and a gear stage is in place and the motor vehicle is at standstill. The characteristic field or characteristic line is dependent upon the gear stage which is engaged. The above-described measures are carried out by the enabling means 174 to which corresponding data is supplied from the measuring device.

The adaptation strategy is essentially provided in the state of the art mentioned at the introduction to this specification.

The steady-state deviation of the idle speed controller output signal from 0 (d_mo_LLr) is detected and, for at least one operating point (for example, for the characteristic field for the motor torque loss for a specific operating point of the engine temperature and/or of the rotational speed) an adaptation value is computed which is added to the characteristic field value corresponding to the operating point or to all near-by characteristic field values or characteristic line values or to all characteristic field values or characteristic line values. Preferably, this is carried out in the context of a control loop of the controller output signal d_m_LLr to the value zero as shown in the state of the art.

In another embodiment, for example, for a measuring value of the engine temperature T_mot, the two temperature support positions $T_1$ and $T_2$ adjacent to this measuring value are determined and an adaptation value $A_1$ or $A_2$ is computed for each support position in dependence upon the steady-state controller output signal d_mo_LLr. The adaptation value $A_1$ or $A_2$ is added to each characteristic field value with the particular temperature support point. Here, it is advantageous to weight the adaptation in dependence upon the deviation of the measured value from the support position:

$A_1$=const.*d_mo_LLr*f(T_mot-$T_1$)
$A_2$=const.*d_mo_LLr*f(T_mot-$T_2$)

The term f(T_mot-$T_{1/2}$) is the weighting function and is dependent upon distance of the measured value from the particular support point.

A comparable procedure results advantageously in combination with the adaptation of the rotational speed dependency.

With reference to ancillary equipment or with reference to the transmission component for a characteristic field or characteristic line, which is dependent upon the gear engaged, the adaptation is carried out in the sense of a control of the idle speed controller output signal to 0.

The determination of the coupling torque desired value is omitted in the embodiment without detecting the driver request.

Figure 3:
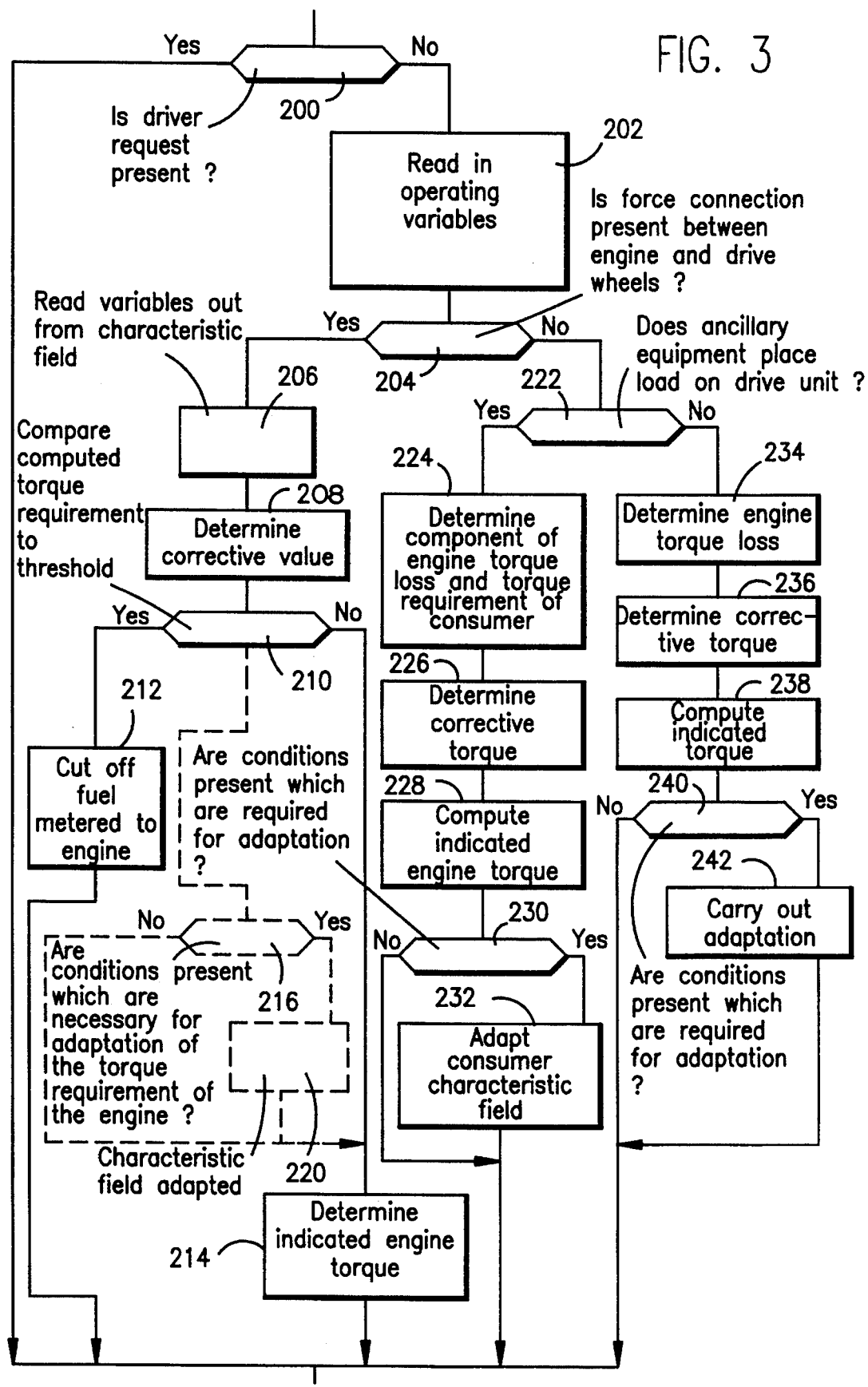

The above procedure will now be explained with respect to the flowchart of FIG. 3.

After the start of the program part, a check is made in a first inquiry step 200 as to whether the motor vehicle is in normal driving operation, that is, if a driver request is present (actuated accelerator pedal). If this is the case, then the program part is ended. If the motor vehicle is outside of the normal driving operation, then the program part continues with step 202. In step 202, the operating variables are read in, which are necessary for the subsequent computation of the precontrol or for carrying out the control. These variables essentially include the turbine rotational speed n_turb or, the output rotational speed n_ab if a corresponding measuring device is not present and the transmission ratio U, oil temperature T_oil, the engine rotational speed n_mot, the engine temperature T_mot, the status of the ancillary equipment (or measuring values which express the load by this ancillary equipment) as well as the idle rotational speed desired value n_LL_des.

In the next inquiry step 204, a check is made as to whether a force connection is present between engine and drive wheels (for example, if a gear is engaged). If this is the case, then in step 206, the variables are read out from the characteristic fields, which represent the engine torque loss mo_loss or the torque requirement of consumers mo_cons. In addition, the torque requirement of the transmission unit (converter) mo_conv is read out from a characteristic field or the variables are computed pursuant to the above-mentioned formula. Thereafter, in step 208, the corrective value is determined by the torque control d_mo_LLr by means of the control strategy from the difference between the desired and actual values of the engine speed. Thereafter, in the case that the torque requirement of the converter is computed in accordance with the above-described formula, the inquiry step 210 follows in which the computed torque requirement value of the converter is compared to the above-mentioned threshold. If the torque requirement drops below this threshold, then the fuel metered to the engine is cut off in accordance with step 212 and the program part is ended. In the opposite case, the indicated engine torque mo_ind is computed from the sum of the determined torque components and supplied to the adjusting means of the drive unit. Thereafter, the program part is ended.

If the torque requirement of the converter is determined based on a characteristic field, then in lieu of steps 210 to 214, the inquiry step 216 is inserted with the aid of which a check is made as to whether the conditions are present which are necessary for the adaptation of the torque requirement of the transmission unit. If this is not the case, then, in accordance with step 214, the indicated engine torque is determined from the sum of the computed torque components and emitted. In the other case, the characteristic field is adapted in accordance with step 220 and the above description. Thereafter, the emission of the indicated torque takes place in accordance with step 214 and thereafter the program part is ended.

If it is recognized in inquiry step 204 that no force connection is present (for example, no gear engaged), then, in step 222, a check is made as to whether ancillary equipment place a load on the drive unit. Here, it is noted that the inquiry step 222 can be repeated for each individual consumer or for groups of consumers so that the determination and adaptation of the torque requirement for each consumer can be carried out individually. A drawing showing this is omitted for the sake of clarity, so that in the following a generalized description is selected with respect to climate control apparatus as an example.

If it is determined in step 222 that the consumer is switched on, then in step 224, the component of the engine torque loss mo_loss as well as the variable of the torque requirement of the consumer mo_cons are determined in correspondence to the stored characteristic fields. In the next step 226, the corrective torque value of the idle rotational speed control d_mo_LLr is determined and, in step 228, the indicated engine torque m_ind is computed from the sum of the component torques and emitted. In the inquiry step 230 which follows, a check is made as to whether the conditions are present which are necessary for the adaptation of the characteristic field for the ancillary equipment. If this is not the case, then the program part is ended. Otherwise, according to step 232, the consumer characteristic field or fields are adapted in accordance with the above-mentioned description and thereafter the program part is ended.

If in step 222, a determination is made that no consumer is switched on which loads the drive unit, then, in accordance with step 234, the engine torque loss mo_loss is determined from the characteristic field. Thereafter, in step 236, the corrective torque component of the idle rotational speed control d_mo_LLr is determined and, in step 238, the indicated torque mo_ind to be emitted is computed.

In correspondence to the other branches of the program part, an inquiry is made in the following inquiry step 240 as to whether the conditions are present which are required for the adaptation of the characteristic field. If this is not the case, the program part is ended, otherwise, according to step 242, the adaptation is carried out in dependence upon the output signal of the idle rotational speed controller. Thereafter, the program part is ended.

The above-described characteristic fields or characteristic lines are also active during driving operation for correcting the indicated torque. The idle control is, however, switched off.

In addition, the above measures can be applied individually or in any desired combination for controlling a drive chain. For example, only the computation of the torque requirement of the transmission unit, with the aid of the above formula, is provided or, the correction can be provided on the basis of the torque loss and/or ancillary equipment with adaptation or combinations of these measures.

It is understood that the foregoing description is that of the preferred embodiments of the invention and that various changes and modifications may be made thereto without departing from the spirit and scope of the invention as defined in the appended claims.

What is claimed is:

1. An arrangement for controlling the torque of a drive unit of a motor vehicle during at least one of the following modes of operation of the vehicle: stationary and rolling, the arrangement comprising:

means for determining a pregiven desired value for the torque to be supplied by the drive unit;

means for adjusting said pregiven desired value while considering the load applied to said drive unit;

correcting means for correcting said desired value in dependence upon the torque requirement of the transmission unit of the motor vehicle so as to cause the rotational speed of the drive unit to be constant essentially independently of the load when said motor vehicle is stationary or rolling with the drive unit being at idle or in the near-idle range.

2. The arrangement of claim 1, said correcting means being adapted to correct said desired value for said torque at least in dependence upon the torque losses of the drive unit and/or the torque requirement of ancillary consumers which load said drive unit.

3. The arrangement of claim 2, said transmission unit being an automatic transmission having a converter having a torque requirement; and, the arrangement further comprising means for determining said torque requirement of said converter in dependence upon the rpm desired value of an idle speed controller and upon the turbine rpm of said converter.

4. The arrangement of claim 3, wherein said torque requirement of said converter is determined in dependence upon the temperature of the oil thereof.

5. The arrangement of claim 1, wherein the torque developed by said drive unit includes a torque loss component and said component of torque loss is determined from a characteristic field in dependence upon the temperature of the drive unit and on the rpm of the drive unit.

6. The arrangement of claim 1, wherein: the torque requirement of the transmission unit is determined from at least a characteristic field in dependence upon the gear in which said transmission is placed.

7. The arrangement of claim 1, wherein the torque requirement of consumers is determined from a characteristic field in dependence upon the variables which are indicative of the load.

8. The arrangement of claim 7, wherein said consumers include a climate control, power steering and a generator.

9. The arrangement of claim 1, further comprising an idle speed controller adapted to correct said torque supplied by the drive unit in dependence upon actual and desired speeds.

10. The arrangement of claim 1, wherein said desired value for said torque is dependent upon the driver request and/or from the torque requirement of the drive chain which includes said transmission unit.

11. An arrangement for controlling the torque of a drive unit of a motor vehicle for at least one of the following states of operation of the vehicle: stationary and rolling, the arrangement comprising:

means for determining a pregiven desired value for the torque to be supplied by the drive unit;

means adjusting said pregiven desired value while considering the load applied to said drive unit;

correcting means for correcting the torque to be adjusted in dependence upon the torque losses of the drive unit and/or the torque requirement of additional consumers which load the drive unit; and, said correcting means including characteristic fields or characteristic lines which are determined or corrected in dependence upon a deviation signal of an idle speed controller.

12. The arrangement of claim 11, wherein the correction performed by said correcting means takes place separately for each variable when pregiven conditions are present.

13. The arrangement of claim 11, wherein the correction performed by said correcting means takes place for groups of variables separately when pregiven conditions are present.

14. The arrangement of claim 11, wherein said desired value is dependent upon the request of the driver and/or the torque requirement of the drive chain.

* * * * *

UNITED STATES PATENT AND TRADEMARK OFFICE
CERTIFICATE OF CORRECTION

PATENT NO. : 5,484,351

DATED : January 16, 1996

INVENTOR(S) : Hong Zhang and Martin Streib

It is certified that error appears in the above-identified patent and that said Letters Patent is hereby corrected as shown below:

In column 1, line 35: before "is" insert -- It --.

In column 8, line 8: delete "(mo_oss)" and substitute -- (mo_loss) -- therefor.

In column 8, line 46: after "rotates" insert -- at --.

In column 9, line 8: delete "near-by" and substitute -- nearby -- therefor.

In column 9, line 11: delete "d_m_LLr" and substitute -- d_mo_LLr -- therefor.

Signed and Sealed this

Twenty-ninth Day of October 1996

Attest:

BRUCE LEHMAN

Attesting Officer      Commissioner of Patents and Trademarks